INCREASED INFORMATION STORAGE ON RECORDS

Filed March 1, 1962 2 Sheets-Sheet 1

EDWARD H. UECKE
INVENTOR.
BY Norman L. Chalfin
agt

INCREASED INFORMATION STORAGE ON RECORDS

Filed March 1, 1962 2 Sheets-Sheet 2

RECORD STEREO TAPE
CONTAINING FIRST HALF
AND SECOND HALF
ON TO STEREO DISC

EDWARD H. UECKE
*INVENTOR.*

BY Norman L. Chalfin
Agt.

3,226,125
Patented Dec. 28, 1965

3,226,125

INCREASED INFORMATION STORAGE ON RECORDS

Edward H. Uecke, Los Angeles, Calif., assignor to Capitol Records, Inc., Hollywood, Calif., a corporation of California Filed Mar. 1, 1962, Ser. No. 176,544
1 Claim. (Cl. 274—46)

This invention relates to a novel means and method for increasing the information storage capability of disc recordings, and more particularly, to the doubling of said storage capability by the use of both sides of a laterally varying sterophonic disc record groove wherein there is recorded simultaneously a first half and a subsequent half, respectively, of a continuing performance, the performance having been previously recorded, bi-sected and the two respective halves thereof re-recorded simultaneously on the respective halves of the stereophonic record groove.

One example of this application in the field of sound recordings is the "talking book." By this it is meant a recorded performance involving the readings of a long literary work. The majority of long-playing sound records on discs currently in use are recorded and designed to be played at a rotational speed of 33⅓ r.p.m. (revolutions per minute). For talking books, it has become a practice of some sound disc recording producers to employ a rotational speed for the records at 16⅔ r.p.m. One prominent manufacturer of records has even attempted recordings at 8⅓ r.p.m.

At these slower rotational rates there is a deterioration in the maximum frequency response capabilities of the recording. More particularly, the loss is in the higher frequency range in which the desirable overtones of music and speech occur which give the greater impression of realism in the appreciation of the sound of the performance on playback thereof.

Another method in the prior art by which increased duration of recorded performances on discs has been achieved is to increase the number of grooves per inch contained in the recording groove spiral.

The disadvantage of this method is that the dynamic capability of the recording is limited so that for maximum dynamic fidelity, some levels of the recorded information must be maintained so low as to be almost down to the lowest level of surface noise of such recordings.

In order to at least double the time duration over which recorded information may be imparted to and stored upon a grooved-disc sound recording without deterioration either in the audible fidelity or dynamic accuracy for the rotational speed used, this invention contemplates a novel technique whereby there is first made a continuous recording of the information, performance, or lecture, preferably on the upper ½ track of a continuous ribbon magnetic tape. Thereafter, the tape is cut in half and the second half recorded on the other ½ track of the magnetic tape alongside of the first half of the recording. Thus, there will be produced a dual track recording on a single ribbon of magnetic tape. This tape contains adjacent tracks, respectively, of the first half and second half of the performance or other information. The position of the beginning of the second half of the recording and the beginning of the first half of the recording being adjacent laterally on the tape. From this tape used as a master, a two-track disc recording is made wherein the first half and the second half of the recording, respectively, are engraved respectively on the adjacent sides of the "stereophonic" or two-track spiral groove on the disc. This two-track recording disc is the same as currently used in stereophonic disc recordings. The disc recording then becomes the master from which many copies may be pressed in the manner well known to the record manufacturing art.

It is not only possible to record the two successive portions of a lecture, literary reading, drama, or musical performance in this way; one may also record other data, the signals reperesnting any information which is recordable by the techniques of the disc recording art. The important fact of this technique is that copying in quantity is readily possible by pressing the copies from a master pressing plate struck off of the master disc recording produced in the final step of the process described hereinbelow.

The steps of this invention can best be understood with reference to the figures in which a preferred embodiment thereof is illustrated and from the description in the following specification in view of the appended claim. Other variations of the details may occur to those familiar with this art within the ambit of the claimed process.

Figure 1:
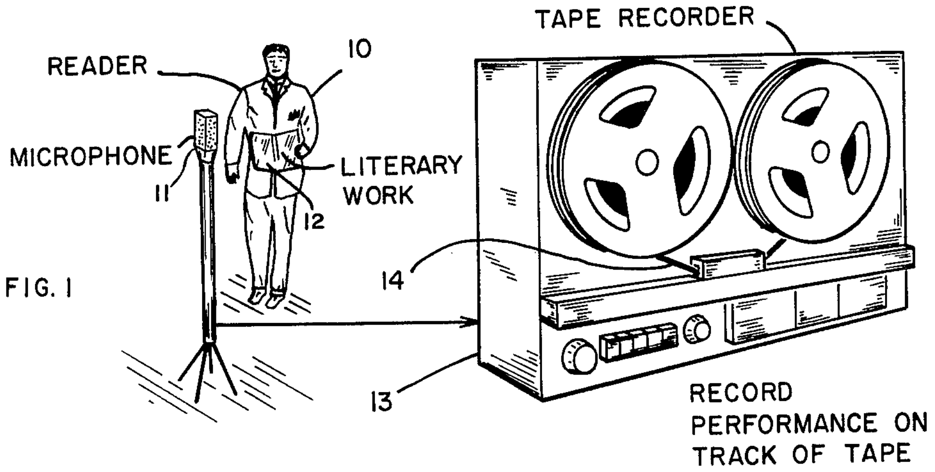
FIGURE 1 illustrates the first recording step of the method of this invention showing generally the means used for recording of the performance on tape.
Figures 2, 3:
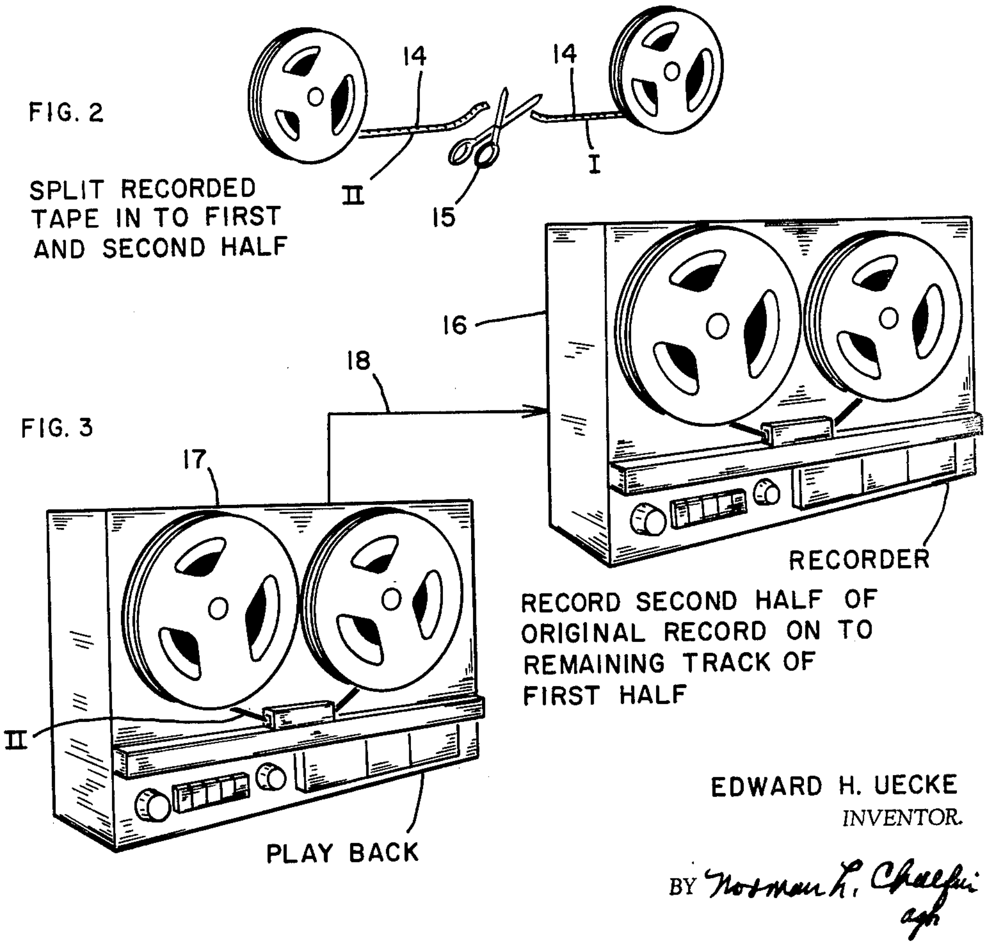
FIGURE 2 illustrates the second step of the method showing a representative means used for the separation of the recording into sequential halves.
FIGURE 3 illustrates the third step of the method showing generally the means used for re-recording the second half of the recording along side the first half thereof.
Figure 4:
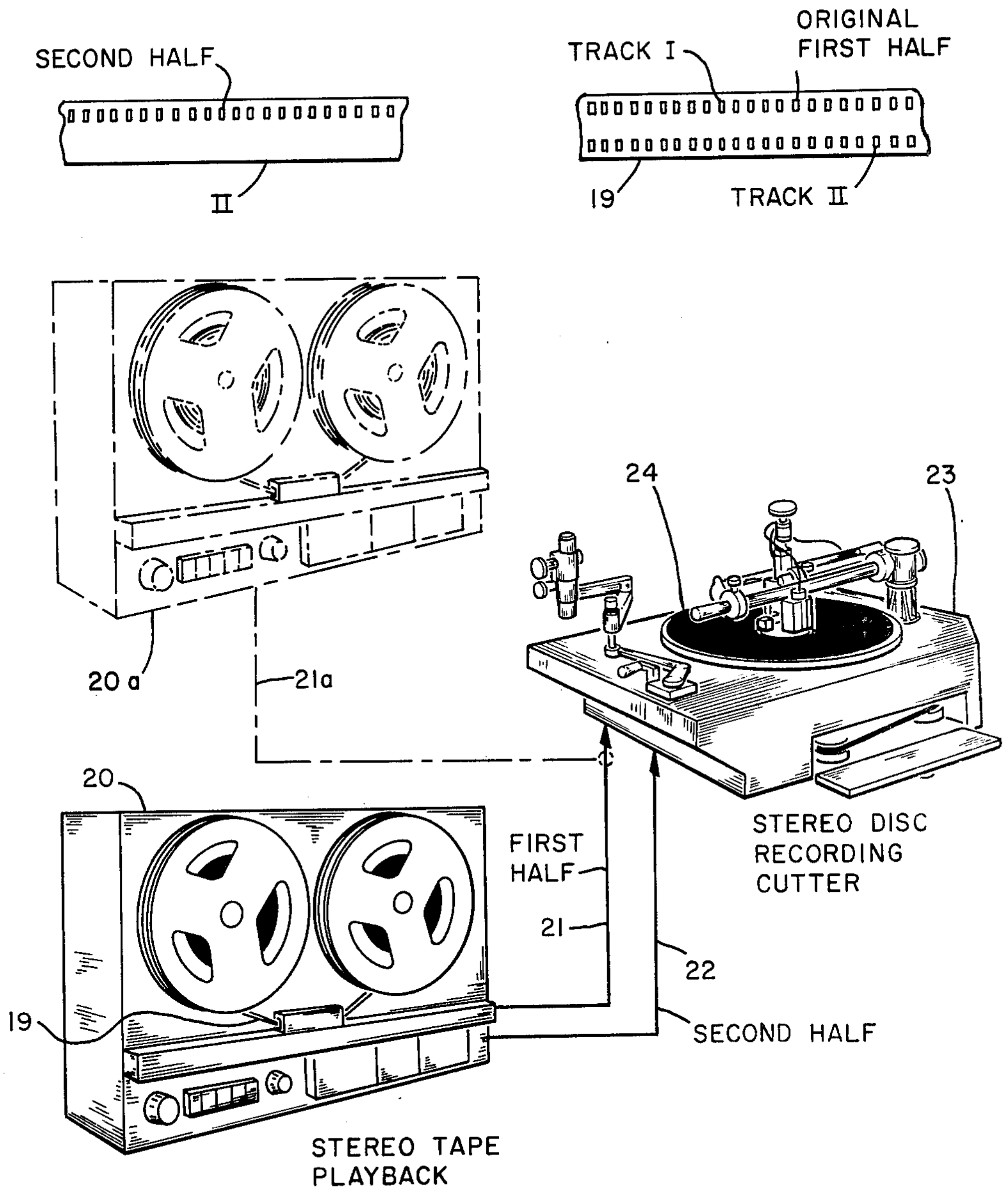
FIGURE 4 illustrates the fourth step in the method of this invention showing generally the means used for the simultaneous recording of the first and second halves of the original recording now on adjacent tracks of a tape onto the single groove of a stereo disc.

From the figures it may be seen that as illustrated in FIGURE 1, the first step is the recording of the performance, here shown as a reading by a reader 10 into a microphone 11 of a literary work 12. However, it is to be clearly understood that the works involved may equally well be musical or dramatic performances or other information capable of being recorded on discs. These will be processed in the same manner as hereinafter set forth. The microphone 11 is connected to a magnetic tape recorder 13 which records the reading, dramatic or musical performance on the upper track of a tape 14. The recording 14 is then cut, as by a scissors 15 forming parts I and II respectively. The section of tape identified as II in step 2 is then placed on a tape play-back machine 17 and part I is placed on a tape recorder 16 and set so that the beginning of part I and the beginning of part II are in the same positions with respect to the starting of the tape. The recorder 16 is of such a nature that only the second track not previously recorded can now be recorded upon. Equipment capable of such recording technique is generally available and is well known in the language laboratory field. The output of tape play-back machine 17 is connected to the input of tape recorder 16, as shown by lead-line 18, so that when both machines are operated, the information on track 2 of the tape from play-back machine 17 is recorded on track 2 of the tape which has only one track recorded thereon so that upon completion, track 1 and track 2 appear on the tape as shown at 19 in step 3.

In step 4 a stereophonic tape playback or a two-track tape reproducer 20 is employed, the two output lines of which are shown as channels 21, 22. These are connected to a stereophonic disc recording machine 23 through its associated amplifiers so that the dual tape tracks of tape 19 now being reproduced on stereophonic or two-track tape playback 20 are re-recorded on the stereophonic disc 24 in such fashion that the first half and second half, respectively, independently modulate the respective halves of the stereophonic grooves on disc 24.

Alternatively, the tape unit shown in dashed outline at 20*a* may be used in addition to another tape unit such as 20 each incorporating only single-track playback facilities. Thus, each of the playback units (20, 20*a*) respectively, may be used to reproduce one of the respective halves of the recording previously referred to. If both of the tape reproducers 20, 20*a* are operated simultaneously, then the one half may be transmitted from playback 20*a* through line 21*a* to stereophonic disc recording machine 23 and the other half from playback 20 through line 22 to recording machine 23. The stereophonic recording as described above is then made on disc 24 wherein the adjacent sides of the stereophonic groove are each modulated independently with the respective halves of the performance or program.

A fifth step, then, in one embodiment of the process, is the processing of the master disc 24 created in the recording process by a stereo disc recorder 23, and the subsequent manufacture of disc pressings from the processed disc masters in accordance with the current practice in the disc recording industries.

What is claimed as new in this method is:

The method of recording information on a single face of a sound recording disc comprising the steps of:

recording a continuous performance on one track on a magnetic tape;

cutting the tape in half creating thereby a first half containing the beginning of the performance and a second half containing the completion of the performance;

re-recording said completion of said performance from said second half of said tape onto the remaining track of said first half of said tape thereby providing a tape recording containing on the first track thereof the beginning of a performance and on the parallel second track thereof the completion of said performance in such fashion that both said beginning and said completion could be reproduced simultaneously; and re-recording said tape containing both said beginning and said completion of said recording onto a stereophonic disc in such fashion that said beginning track thereon and said completion track thereon are in adjacent sides of the stereophonic groove created by said stereophonic recording to form thereby a master disc recording.

References Cited by the Examiner

UNITED STATES PATENTS

| | | | |
|---|---|---|---|
| 2,114,471 | 4/1938 | Keller | 179—100.4 |
| 2,911,482 | 11/1959 | Dostert | 179—100.2 |
| 2,977,424 | 3/1961 | Redlich | 179—100.4 |

LOUIS J. CAPOZI, *Primary Examiner.*

A. F. GUIDA, *Examiner.*